United States Patent
Morishita

(10) Patent No.: US 9,928,306 B2
(45) Date of Patent: Mar. 27, 2018

(54) WEB PAGE EDITING METHOD, APPARATUS, AND MEDIUM

(71) Applicant: FUJITSU LIMITED, Kawasaki-shi, Kanagawa (JP)

(72) Inventor: Ryohei Morishita, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 14/636,536

(22) Filed: Mar. 3, 2015

(65) Prior Publication Data

US 2015/0278389 A1 Oct. 1, 2015

(30) Foreign Application Priority Data

Mar. 31, 2014 (JP) .................................. 2014-073372

(51) Int. Cl.
| | | |
|---|---|---|
| *G06F 17/00* | (2006.01) | |
| *G06F 17/30* | (2006.01) | |
| *G06F 17/22* | (2006.01) | |
| *G06F 17/24* | (2006.01) | |

(52) U.S. Cl.
CPC .... *G06F 17/30896* (2013.01); *G06F 17/2247* (2013.01); *G06F 17/24* (2013.01)

(58) Field of Classification Search
CPC ......................... G06F 17/3089; G06F 17/2247
See application file for complete search history.

(56) References Cited

U.S. PATENT DOCUMENTS

| | | | | |
|---|---|---|---|---|
| 6,941,562 | B2* | 9/2005 | Gao | ........................ G06F 9/547 709/203 |
| 7,234,107 | B1 | 6/2007 | Aoki et al. | |
| 7,376,653 | B2* | 5/2008 | Hart, III | .................. H04L 67/06 707/957 |
| 7,610,406 | B2* | 10/2009 | Wu | ...................... G06F 17/2247 707/999.01 |
| 7,849,437 | B2* | 12/2010 | Isaacs | ............... G06F 17/30893 717/100 |

(Continued)

FOREIGN PATENT DOCUMENTS

| | | |
|---|---|---|
| JP | 2000-222324 | 8/2000 |
| JP | 2003-36223 | 2/2003 |

(Continued)

OTHER PUBLICATIONS

Chen, "Widget Identification and Modification for Web 2.0 Access Technologies (WIMWAT)" Sigaccess Newsletter, Issue 96, Jan. 2010, p. 11-18.*

(Continued)

*Primary Examiner* — Amelia Tapp
(74) *Attorney, Agent, or Firm* — Staas & Halsey LLP

(57) ABSTRACT

An apparatus includes a storage device and a processor coupled to the storage device and configured to acquire a web page description to be edited, detect a description that refers to a library written in an interpretive language in the acquired web page description, and generate a description of a modified web page in which the web page description is modified by inserting, into the web page description, code for sensing completion of initialization of the library corresponding to the detected description and code for editing a description in the interpretive language using the library corresponding to the detected description.

9 Claims, 8 Drawing Sheets

(56) References Cited

U.S. PATENT DOCUMENTS

| | | | | |
|---|---|---|---|---|
| 9,165,308 B2 * | 10/2015 | Cook | ................... | G06Q 30/02 |
| 9,332,068 B2 * | 5/2016 | Bryan | ................... | G06F 9/541 |
| 2008/0307390 A1 * | 12/2008 | Marchant | ................ | G06F 8/315 |
| | | | | 717/115 |
| 2014/0047413 A1 * | 2/2014 | Sheive | ................. | H04L 65/403 |
| | | | | 717/110 |

FOREIGN PATENT DOCUMENTS

| | | |
|---|---|---|
| JP | 2005-182342 | 7/2005 |
| JP | 2010-140076 | 6/2010 |

OTHER PUBLICATIONS

Huynh et al., "Enabling Web Browsers to Augment Web Sites' Filtering and Sorting Functionalities" UIST'06, Oct. 15-18, 2006, Montreux, Switzerland, Copyright 2006 ACM, p. 125-134.*
Maras et al., "Client-side Web Application Slicing" ASE 2011, Lawrence, KS, USA, copyright 2011 IEEE, p. 504-507.*

* cited by examiner

FIG. 3

```
<!DOCTYPE html>
...
<head>
<script src="xxx/yyy/bbb.js"></script>
<script src="ccc1.js"></script>
<script src="zzz/ccc2.js"></script>
</head>
<body>
...
</body>
</html>
```

FIG. 4

| JavaScript LIBRARY | ID | LIBRARY REFERENCE DEFINITION | INTERPRETATION START TRIGGER |
|---|---|---|---|
| A | 1 | aaa.js | window.body.onload |
| B | 2 | xxx/yyy/bbb.js | B.InitializedListener |
| C | 3 | ccc1.js, zzz/ccc2.js | C.ready |

FIG. 5

```
<!DOCTYPE html>
...
<head>
<script src="FOR EDIT PROCESSING.js"></script>
<script src="xxx/yyy/bbb.js"></script>
<script src="ccc1.js"></script>
<script src="zzz/ccc2.js"></script>
</head>
<body>
...
</body>
<script type="text/javascript">//<![CDDATA[
var tmp = this.document.body.onload;
this.document.body.onload = function(){
tmp();
B.InitializedListener (WEB PAGE INTERPRETATION START PROCESSING());
C.ready(WEB PAGE INTERPRETATION START PROCESSING());
}
//]]></script>
</html>
```

A — <head>
B — <script src="FOR EDIT PROCESSING.js"></script>
C — <script src="xxx/yyy/bbb.js"></script> / <script src="ccc1.js"></script>
D — </body>
E — script block

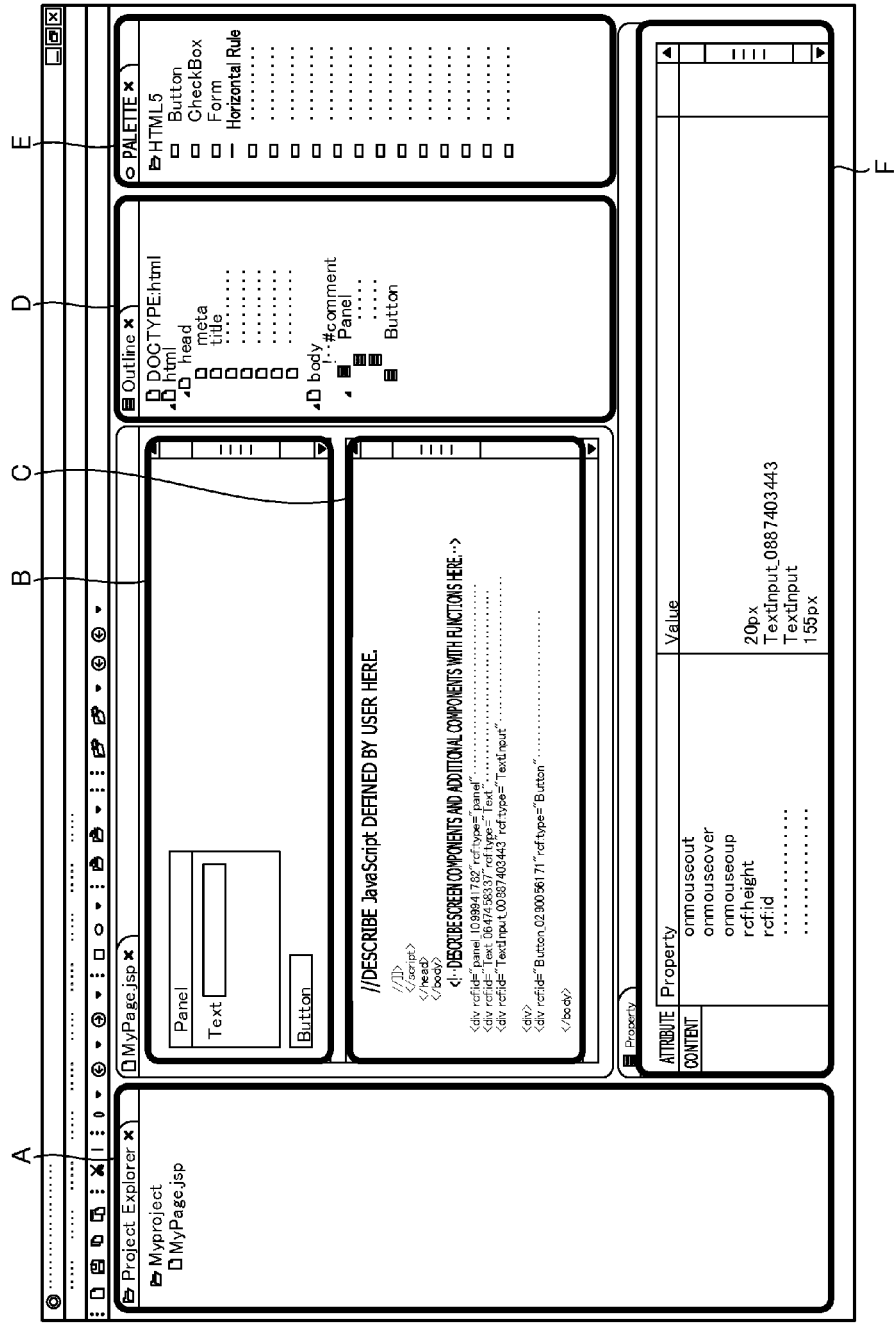

WEB PAGE EDITING METHOD, APPARATUS, AND MEDIUM

CROSS-REFERENCE TO RELATED APPLICATION

This application is based upon and claims the benefit of priority of the prior Japanese Patent Application No. 2014-073372, filed on Mar. 31, 2014, the entire contents of which are incorporated herein by reference.

FIELD

The embodiments discussed herein are related to a web page editing method, an apparatus, and a medium.

BACKGROUND

Owing to recent developments in web technologies, new libraries written in an interpretive language, such as JavaScript (registered trademark), have appeared. Editing of a web page using such libraries is performed.

An editing device for providing a function of editing a web page using libraries provides a function of editing JavaScript code portions included in a web page as well as hypertext markup language (HTML) portions of the web page.

For example, as the technique for editing web pages, there is known a technique for editing a web page in a preview area of the screen. Specifically, editing of a web page is achieved by reading a web page description, interpreting components, such as radio buttons, which form a screen, generating overlay elements for editing, and displaying a preview screen.

In such a manner, although the preview screen upon editing of a web page is displayed after interpretation of components within the web page, components are interpreted only after completion of initialization of libraries. For this reason, there are known an approach in which interpretation of components is started after a fixed time period has elapsed since a web page description was read, and an approach in which, every fixed time period, interpretation of components is started after it is checked whether or not initialization of libraries is completed. In addition, as a related-art technique for web page editing, there is known a technique in which, before a browser interprets a web page, the content is edited by using a proxy or the like.

Examples of the related art include Japanese Laid-open Patent Publication No. 2000-222324 and Japanese Laid-open Patent Publication No. 2010-140076.

SUMMARY

According to an aspect of the invention, an apparatus includes a storage device and a processor coupled to the storage device and configured to acquire a web page description to be edited, detect a description that refers to a library written in an interpretive language in the acquired web page description, and generate a description of a modified web page in which the web page description is modified by inserting, into the web page description, code for sensing completion of initialization of the library corresponding to the detected description and code for editing a description in the interpretive language using the library corresponding to the detected description.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a web page description to be edited;

FIG. 4 is a table illustrating an example of information stored in a start trigger definition DB;

FIG. 5 illustrates an example of information stored in a modified DB;

FIG. 6 is a pictorial representation illustrating an example of a web editing screen;

DESCRIPTION OF EMBODIMENTS

The investigation carried out by the present inventor will be initially described. When waiting for completion of initialization of libraries, a wasteful waiting time occurs in some cases, and as a result, it takes a long time until editing of a web page can be started.

For example, the initialization time period of a JavaScript library is dependent on the library and dependent on the execution environment. In particular, in cases where a plurality of libraries are used within a web page, the initialization time period varies from one library to another.

Consequently, with the approach in which interpretation of components is started after the elapse of a fixed time period, it is difficult to set a definite, fixed time period. The fixed time period is thus set to be relatively long, which results in an undesirable waiting time. With the approach in which completion is checked for every fixed time period, the waiting time period might be reduced by decreasing the interval between checks. In this case, however, checking is frequently performed until completion of initialization of libraries is confirmed. This results in an increase in processing load.

According to embodiments described below, the time period taken until the start of editing of a web page may be reduced.

Hereinafter, embodiments of an editing support program, an editing support method, and an editing support apparatus will be described in detail with reference to the accompanying drawings. It is to be noted that this disclosure is not limited to the embodiments.

First Embodiment

Overall Configuration

Figure 1:
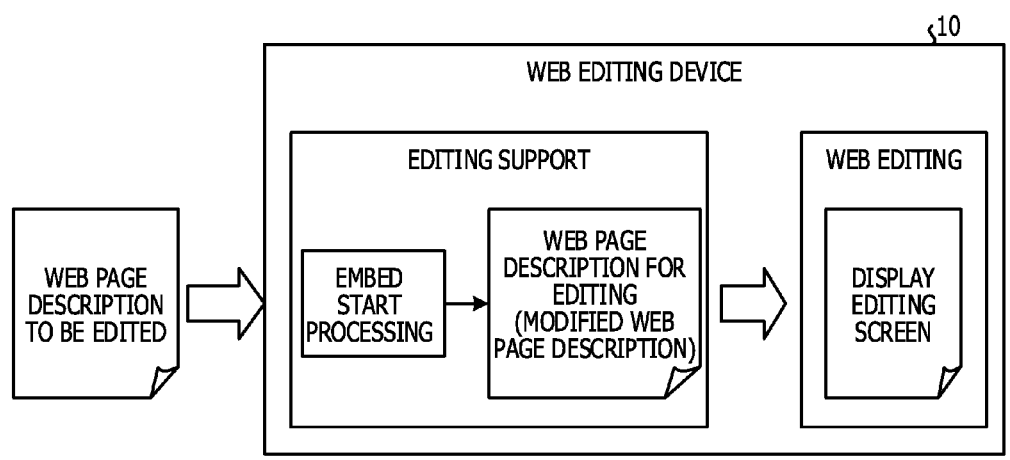
FIG. 1 is a diagram for explaining web editing according to a first embodiment.

FIG. 1 is a diagram for explaining web editing according to a first embodiment. As illustrated in FIG. 1, a web editing device 10 is a server device having a function that performs editing support and a function that performs web editing, and is an example of the editing support apparatus. The web editing device 10 provides a function that edits not only HTML portions of a web page but also portions of JavaScript code included in the web page.

Although an example in which the web editing device includes both functions of editing support and web editing is described herein, the web editing device is not limited to this. For example, a device having a editing support function and a device having a web editing function may be implemented in separate housings.

During the stages of creation and improvement of a web page, the web editing device 10 reads a web page description to be edited and displays a preview screen on a display or the like, in response to a request from a developer of the web page, or the like.

Specifically, the web editing device 10 interprets components of the web page description to be edited, displays a preview screen after the interpretation of components, and performs a variety of editing operations. By way of example, the web editing device 10 accepts changes in the locations of components, such as radio buttons and lists, arranged on a web page, changes in components, changes in arrangement of moving images attached to the web page, and so on, and edits the web page.

In such a situation, the web editing device 10 illustrated in FIG. 1 acquires a web page description to be edited. The web editing device 10 detects reference to a library written in an interpretive language included in the acquired web page description. Subsequently, the web editing device 10 generates a web page description after modification in which code for detecting completion of initialization of the library, the reference to which is detected, and code for editing a description in the interpretive language using the library are inserted into the web page description.

After that, the web editing device 10 reads the web page description after modification, initializes the library and interprets components, and then causes a web browser to read the web page description after modification has been performed and displays an edit screen using the web browser so as to accept editing of the web page.

That is, in order to deal with the issue that JavaScript (registered trademark) is executed immediately after reading of a web page description, the web editing device 10 creates a web page description for editing and then causes the web browser to read it. Specifically, before reading a web page description to be edited, the web editing device 10 generates a web page description modified for editing by inserting, into an HTML document of the web page, source code for sensing completion of initialization of a library to which JavaScript refers to.

As a result, the web editing device 10 may register a trigger for interpretation as an event listener of completion of initialization of the JavaScript library. Accordingly, the web editing device 10 may start interpreting components without delay after completion of initialization of a library. This may reduce a time period from reading of a web page to the start of editing. Thus, the time period taken until the start of editing of a web page may be reduced.

Functional Configuration

Figure 2:
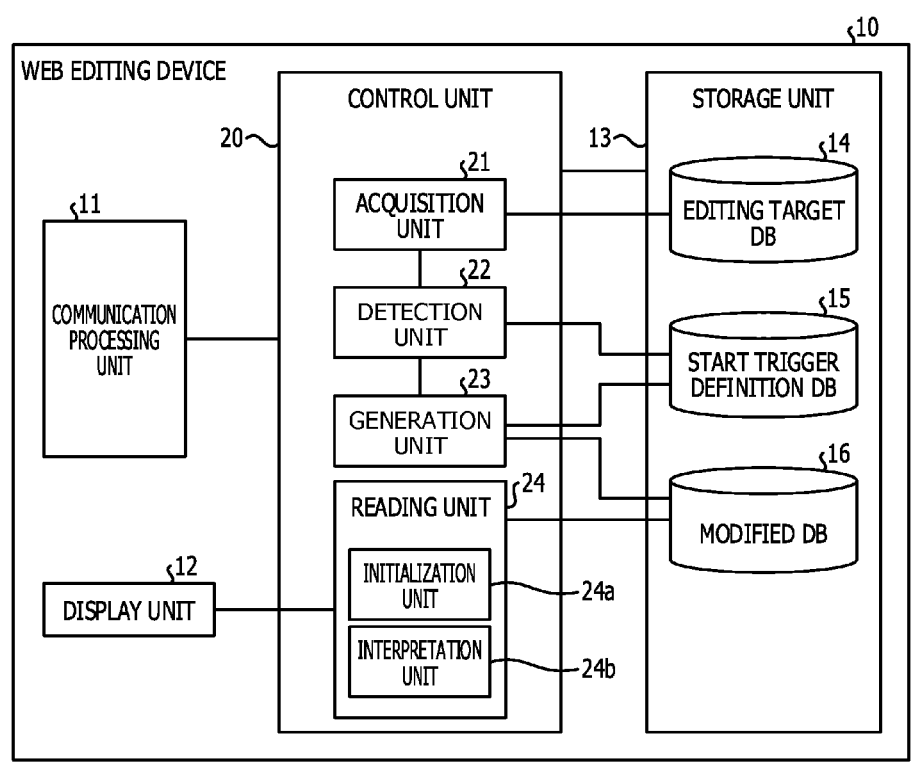
FIG. 2 is a functional block diagram illustrating a functional configuration of a web editing device according to the first embodiment.

FIG. 2 is a functional block diagram illustrating a functional configuration of the web editing device according to the first embodiment. As illustrated in FIG. 2, the web editing device 10 includes a communication processing unit 11, a display unit 12, a storage unit 13, and a controller 20.

The communication processing unit 11 is a processing unit that controls communication of other devices, and is, for example, a network interface card or the like. The communication processing unit 11 reads a web page from an external device and stores it in an editing target DB 14.

The display unit 12 is a display device, such as a display, that displays a variety of information. This display unit 12 displays an edit screen or the like outputted from the controller 20.

The storage unit 13 is a storage device that stores various programs to be executed by a processor, data, and so on, and is, for example, a semiconductor memory, a hard disk, or the like. This storage unit 13 stores the editing target DB 14, a start trigger definition DB 15, and a modified DB 16.

The editing target DB 14 is a database that stores a web page description to be edited. Specifically, the editing target DB 14 stores source code acquired from a web page to be edited. Note that information stored here may be stored by an administrator or the like, or may be acquired from an external device and stored by the communication processing unit 11.

Here, an example of source code of a web page to be edited that the editing target DB 14 stores is described. FIG. 3 illustrates an example of a web page description to be edited. The example illustrated in FIG. 3 is an example of source code written in HTML. In this source code, by using script tags, reference to a library (xxx/yyy/bbb.js) and a library (zzz/ccc2.js) is defined.

The start trigger definition DB 15 is a database that stores definitions of event listeners of completion of initialization of libraries written in an interpretive language, such as JavaScript (registered trademark), used in the web page. That is, the start trigger definition DB 15 stores code for detecting completion of initialization of libraries referred to in the web page, and the like.

FIG. 4 is a table illustrating an example of information stored in a start trigger definition DB. As illustrated in FIG. 4, the start trigger definition DB 15 stores "JavaScript library", "ID", "Library reference definition", and "Interpretation start trigger" in association with one another. "Library" is the name of a library referred to, or the like, and "ID" is an identifier that uniquely identifies a library. "Library reference definition" is information indicating reference to a library in a web page. "Interpretation start trigger" is a trigger that starts interpreting a web page, that is, this indicates code for starting interpretation of components after reading a web page.

In the example of FIG. 4, a library B identified by an ID of 2 is defined as "xxx/yyy/bbb.js" in a web page description, and, for the library B, "B. InitializedListener" is registered as the interpretation start trigger.

The modified DB 16 is a database storing a web page description after modification that is generated as a target to be edited. Information stored here is stored with a generation unit 23 described below. FIG. 5 illustrates an example of information stored in a modified DB. The example illustrated in FIG. 5 is an example in which code for sensing completion of initialization of libraries and code for editing descriptions in an interpretive language using libraries are added to the source code to be edited illustrated in FIG. 3.

A portion A of FIG. 5 is a reference definition of inserted edit processing source code. A portion B of FIG. 5 is a reference definition of the library B, and a portion C of FIG. 5 is a reference definition of the library C. A portion D of FIG. 5 is a definition that states temporary saving of an existing procedure of body.onload, that is, a definition that states the procedure of an event handler executed after reading of a web page body is temporarily saved.

A portion E of FIG. 5 defines executing the following three operations, which are processing operations newly executed as body.onload. Specifically, executing the temporarily saved body.onload procedure, registering web page interpretation start processing for the interpretation start trigger of the library B, and registering web page interpretation start processing for the interpretation start trigger of the library C are defined. That is, when a web page description after modification is read by the web browser and JavaScript (registered trademark) is executed, the inserted processing is also executed, and thus the trigger for interpretation may be registered as the event listener of completion of initialization. After that, an event of completion of initialization of JavaScript libraries occurs, the event is handled by the event listener, and the processing that starts interpreting components is called.

The controller 20 is a processing unit that manages the entire web editing device 10, and is, for example, an electronic circuit such as a processor. This controller 20 includes an acquisition unit 21, a detection unit 22, the generation unit 23, and a reading unit 24. The acquisition unit 21, the detection unit 22, the generation unit 23, and the reading unit 24 are examples of processes performed by an electronic circuit included in the controller 20 or by the controller 20.

The acquisition unit 21 is a processing unit that acquires a web page description to be edited. Specifically, upon acceptance of start of editing of a web page from the user, the acquisition unit 21 acquires a web page description in question from the edit target DB 14 and outputs it to the detection unit 22.

The detection unit 22 is a processing unit that detects reference to a library from the web page description acquired by the acquisition unit 21. Specifically, the detection unit 22 detects code for defining reference to a library, from source code of a web page to be edited.

For example, the detection unit 22 searches the web page description to be edited for code described in the library reference definition of the start trigger definition DB 15. In the example of FIG. 3, the detection unit 22 detects "xxx/yyy/bbb.js" and "zzz/ccc2.js", and thus detects reference to the library B and the library C and outputs the result to the generation unit 23.

The generation unit 23 generates a modified web page description in which code for sensing completion of initialization of libraries, reference to which has been detected, and code for editing JavaScript (registered trademark) using the libraries are inserted in a web page description to be edited.

Specifically, the generation unit 23 inserts source code for processing of registering a trigger for interpretation as an event listener of completion of initialization of a JavaScript library, into a web page description to be edited. This source code is in accordance with a JavaScript library used in a web page. The generation unit 23 further inserts source code for editing JavaScript (registered trademark) into the web page description to be edited.

In the example of FIG. 3, since the library B and the library C are detected by the detection unit 22, the generation unit 23 specifies the interpretation start trigger "B. InitializedListener" corresponding to the library B and the interpretation start trigger "C. ready" corresponding to the library C from the start trigger definition DB 15. After that, as illustrated in FIG. 5, the generation unit 23 inserts the source code indicated in the portion A of FIG. 5 and the source code indicated in the portions D and E of FIG. 5 into the web page description illustrated in FIG. 3, thereby generating a web page description after modification. After that, the generation unit 23 stores the modified web page description in the modified DB 16. Note that although the example in which source code is inserted after "body" in HTML is illustrated by way of example in FIG. 5, the location at which source code is inserted may be arbitrarily set as long as the location does not affect the original web page.

The reading unit 24 includes an initialization unit 24a and an interpretation unit 24b and is a processing unit that executes editing of a web page using these units. The reading unit 24 acquires and reads a modified web page description to be edited from the modified DB 16. Then, the reading unit 24 executes a script "for edit processing.js" described in the modified web page description to start various types of processing for displaying a preview screen or the like.

The initialization unit 24a is a processing unit that performs initialization of a library referred to in the modified web page description. Specifically, when a modified web page description is read by the reading unit 24, the initialization unit 24a detects a script that refers to a library, from this web page description, and performs initialization of the library in question.

In the example of FIG. 5, the initialization unit 24a performs initialization of the library B, reference to which is defined by using "xxx/yyy/bbb.js" specified in a script tag. Similarly, the initialization unit 24a performs initialization of the library C, reference to which is defined by "zzz/ccc2.js" specified by using a script tag.

At this point, the initializing unit 24a executes a script (E of FIG. 5) described in the modified web page description. As a result, the initialization unit 24a hooks execution of interpretation processing, and registers the completion of initialization of the library B and the completion of initialization of the library C for a trigger for starting interpretation. That is, the trigger for interpretation is registered as an event listener of completion of initialization.

The interpretation unit 24b executes interpretation of components used in the modified web page description, displays a preview screen or the like, and executes editing of a web page. Specifically, when the modified web page is read by the reading unit 24, the interpretation unit 24b starts interpretation of components in the modified web page description.

However, since the trigger for interpretation is registered as the event listener of completion of initialization by the initialization unit 24a, the interpretation unit 24b waits until initialization of libraries is completed. Then, when a notification of completion of initialization of libraries is given from the initialization unit 24a, the interpretation unit 24b executes interpretation processing of components. After that, the interpretation unit 24b generates overlay elements for editing and displays a preview screen so as to implement editing of the web page.

For example, when the interpretation unit 24b is notified of completion of initialization of the library B and completion of initialization of the library C, the interpretation unit 24b executes interpretation processing of a web page, and, after the completion of the interpretation, causes the web browser to read a modified web page description. Then, the interpretation unit 24b causes the display unit 12 to display a preview screen or the like on which a web page to be edited, source code of the web page, source code of components, various editors of text and so on, a web page after editing, and so on are displayed.

FIG. 6 is a pictorial representation illustrating an example of a web editing screen. As illustrated in FIG. 6, upon completion of processing of interpreting components, the interpretation unit 24b causes the display unit 12 to display a screen for web editing composed of a plurality of display views.

The view of A of FIG. 6 is a view for displaying a file to be edited, the view of B of FIG. 6 is a design view for editing a screen on a web browser, and the view of C of FIG. 6 is a view for editing source code. Additionally, the view of D of FIG. 6 is an outline view for logical expression of components of the design view, the view of E of FIG. 6 is a palette view in which components for arranging components in the design view are provided, and the view of F of FIG. 6 is a property view for displaying properties and the like of components selected in the design view.

That is, the interpretation unit 24b enables editing to be performed on the web browser by using an editor or the like, and displays a preview of a web page after change when the description of the web page is changed. In this way, the interpretation unit 24b may provide web editing and instant checking using a preview screen.

Flow of Processing

Figure 7:
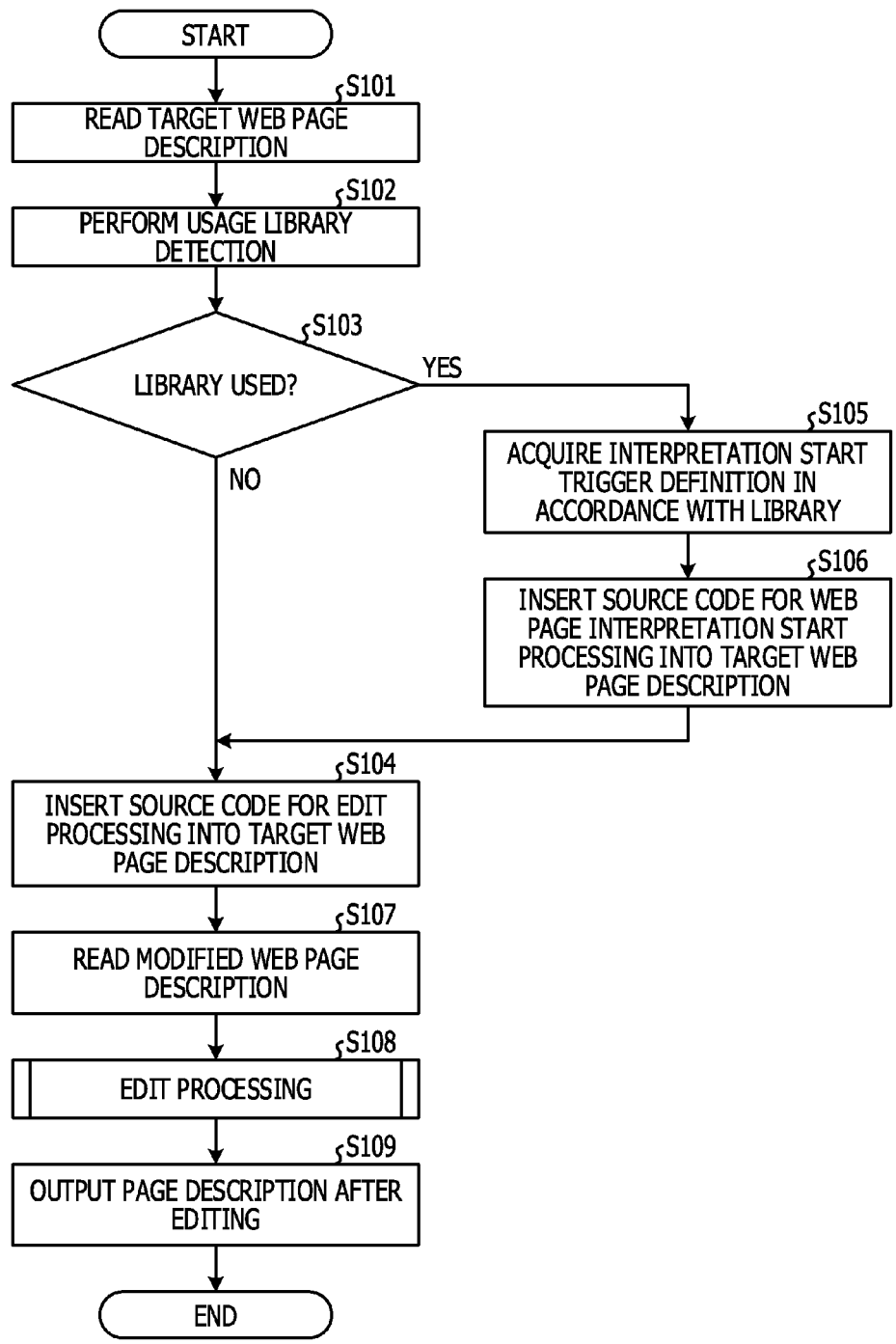
FIG. 7 is a flowchart illustrating a flow of web edit processing according to the first embodiment.

FIG. 7 is a flowchart illustrating the flow of web edit processing according to the first embodiment. As illustrated in FIG. 7, the acquisition unit 21 reads a web page description to be edited (S101), and the detection unit 22 detects a usage library from the read web page description (S102).

Subsequently, if no use of a library is detected (S103: No), the generation unit 23 inserts source code for edit processing into the web page description to be edited (S104).

On the other hand, if the use of a library is detected (S103: Yes), the generation unit 23 acquires the definition of an interpretation start trigger in accordance with the detected library (S105). Then, the generation unit 23 inserts source code for the web page interpretation start processing (S106) and further inserts source code for edit processing (S104) into the web page to be edited.

After that, the reading unit 24 reads the web page description to be edited after modification in which the source code mentioned above is inserted (S107). Then, upon sensing completion of initialization of libraries performed by the initialization unit 24a, the interpretation unit 24b executes web page interpretation including component interpretation and so on and causes the web browser to display various views so as to start edit processing (S108).

After that, upon completion of edit processing, the interpretation unit 24b outputs the web page description after editing to the storage unit 13, a specified file, and so on (S109).

Advantages

Before reading a web page description, the web editing device 10 creates a web page description for editing in which predetermined source code is inserted, in order to deal with the issue that JavaScript (registered trademark) is executed immediately after the reading of the web page description. After that, the web editing device 10 causes the web browser, which is an editing device, to read a web page description after insertion.

Specifically, the web editing device 10 inserts source code for processing of registering a trigger for interpretation as an event listener of completion of initialization of the JavaScript library, into the web page description to be edited. This source code is in accordance with a JavaScript library used in the web page. As a result, when a web page description for editing is read by the web browser and JavaScript (registered trademark) is executed, the inserted processing is also executed, and thereby the trigger for interpretation may be registered as an event listener of completion of initialization. After that, an event of completion of initialization of a JavaScript library occurs, the event is handled by the event listener, and the interpretation start processing is called.

In this way, utilizing characteristics of an editing function, the web editing device 10 checks whether or not the web page to be edited uses a JavaScript library, before the web editing device 10 starts editing. If the library is used, the web editing device 10 creates in advance a web page description for editing into which processing in which the web page interpretation start processing is executed at the occurrence of an event of completion of initialization of a target JavaScript library is inserted.

As a result, since the event-driven interpretation start processing is already inserted into the web page description for editing, it is possible to handle an event if JavaScript (registered trademark) is executed immediately after the web page description for editing is read.

Accordingly, with the web page editing function, the web editing device 10 may reliably detect completion of initialization of a JavaScript library and reduce the wasteful time period for initialization processing until the start of editing of a web page. Note that, as the time period for initialization processing, it takes 500 ms in cases where the polling interval is 1 second, however. In the event-driven method, it takes 16 ms, which is the resolution of a browser timer. This may reduce the time period by about 30 times as compared with the polling method.

Second Embodiment

Now, although the embodiment of the present disclosure has been described, the present disclosure may be carried out in various different forms other than the embodiment described above.

Library

Although the example of JavaScript libraries has been described in the embodiment, the present disclosure is not limited to this and may be similarly applied to any libraries written in an interpretive language. The description examples of various scripts described in the embodiment are merely illustrative and are not limited to those illustrated in the drawings.

Edit Function

Although the example using the method in which overlay elements for editing are generated, a preview screen is displayed, and editing of a web page is thus implemented has been described as an example of a method of editing a web page, the method of editing a web page is not limited to this. For example, various editing methods may be adopted if they provide an editing function by inserting a script or the like into a web page description to be edited.

System

Additionally, in the processing described in the embodiment, all or part of processing that has been described as that automatically performed may be performed manually. Alternatively, all or part of processing that has been described as that manually performed may be performed automatically. In addition, the processing procedures, the control procedures, the specific names, a variety of data and information including parameters illustrated in the foregoing document and drawings may be arbitrarily changed unless otherwise stated.

Additionally, elements of devices are illustrated in the drawings in terms of functional concepts, and it is unnecessary that the elements are configured physically as illustrated in the drawings. That is, specific forms of distribution and integration of devices are not limited to those illustrated in the drawings. That is, all or some of the devices may be configured so as to be functionally or physically distributed and integrated in arbitrary units in accordance with various load and usage conditions. Further, regarding various processing functions performed in devices, all or some thereof may be implemented by a central processing unit (CPU) or a program analyzed and executed on the CPU, or may be implemented as hardware using wired logic.

Hardware

Figure 8:
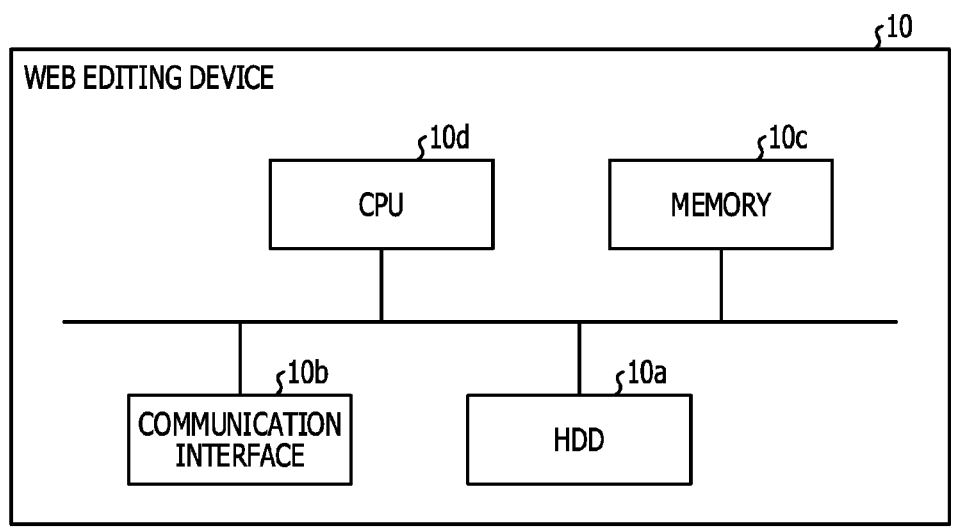
FIG. 8 is a block diagram illustrating an example of a hardware configuration.

FIG. 8 is a block diagram illustrating an example of a hardware configuration. As illustrated in FIG. 8, the web editing device 10 includes a hard disk drive (HDD) 10a, a communication interface 10b, a memory 10c, and a CPU 10d. Additionally, the elements illustrated in FIG. 8 are coupled to one another through a bus or the like.

The HDD 10a stores programs and DBs for operating functions illustrated in FIG. 2 and so on. The communication interface 10b is an interface that controls communication with other devices, and is, for example, a network interface card.

The CPU 10c causes a process of performing functions described in FIG. 2 and so on to operate by reading a program for performing similar processing to that of the processing units illustrated in FIG. 2 and so on from the HDD 10a or the like and developing the program in the memory 10c.

That is, this process performs similar functions to those of processing units included in the web editing device 10. Specifically, the CPU 10d reads a program having similar functions to those of the acquisition unit 21, the detection unit 22, the generation unit 23, the reading unit 24, and so on from the HDD 10a or the like. Then, the CPU 10d executes the process that performs similar processing to that of the acquisition unit 21, the detection unit 22, the generation unit 23, and the reading unit 24.

In this way, the web editing device 10 reads and executes a program, thereby operating as an information processing device that performs the editing support method. Additionally, the web editing device 10 reads the foregoing program from a recording medium with a medium reader, and executes the read foregoing program, thereby implementing similar functions to those of the embodiment described above. Note that the program as used in this embodiment is not limited to being executed by the web editing device 10. For example, the present disclosure may be applied similarly to the case where another computer or a server executes the program, or the case where the computer and the server cooperate to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method comprising:
acquiring, by a processor, a web page description to be edited;
detecting, by the processor, a description that refers to a library written in an interpretive language in the acquired web page description; and
generating, by the processor, a description of a modified web page in which the web page description is modified by inserting, into the web page description before the web page description is read by a web browser, source code for indicating a trigger for interpretation to be executed upon completion of initialization of the library corresponding to the detected description and code for editing a description in the interpretive language using the library corresponding to the detected description.

2. The method of claim 1, further comprising:
reading, by the processor, the source code defined for the library from a storage device when generating the description of the modified web page.

3. The method of claim 1, further comprising:
when detecting the description that refers to the library written in the interpretive language, detecting, by the processor, each of a plurality of the descriptions that refers to a corresponding one of a plurality of the libraries written in the interpretive language, the descriptions being included in the web page description; and
when generating the description of the modified web page, generating, by the processor, the description of the modified web page so as to start the code for editing after completion of initialization of each of the libraries corresponding to one of the detected descriptions.

4. An apparatus comprising:
a storage device; and
a processor coupled to the storage device and configured to:
acquire a web page description to be edited;
detect a description that refers to a library written in an interpretive language in the acquired web page description; and
generate a description of a modified web page in which the web page description is modified by inserting, into the web page description before the web page description is read by a web browser, source code for indicating a trigger for interpretation to be executed upon completion of initialization of the library corresponding to the detected description and code for editing a description in the interpretive language using the library corresponding to the detected description.

5. The apparatus according to claim 4, wherein the processor is configured to:
read the source code defined for the library from a storage device when generating the description of the modified web page.

6. The apparatus according to claim 4, wherein the processor is configured to:
when detecting the description that refers to the library written in the interpretive language, detect each of a plurality of the descriptions that refers to a corresponding one of a plurality of the libraries written in the interpretive language, the descriptions being included in the web page description; and
when generating the description of the modified web page, generate the description of the modified web page so as to start the code for editing after completion of initialization of each of the libraries corresponding to one of the detected descriptions.

7. A non-transitory computer-readable medium storing therein a program that causes the computer to execute a process, the process comprising:
acquiring a web page description to be edited;
detecting a description that refers to a library written in an interpretive language in the acquired web page description; and
generating a description of a modified web page in which the web page description is modified by inserting, into the web page description before the web page description is read by a web browser, source code for indicating a trigger for interpretation to be executed upon completion of initialization of the library corresponding to the detected description and code for editing a description in the interpretive language using the library corresponding to the detected description.

8. The non-transitory computer-readable medium according to claim 7, wherein the process comprising:
reading the source code defined for the library from a storage device when generating the description of the modified web page.

9. non-transitory computer-readable medium according to claim 7, wherein the process comprising:
when detecting the description that refers to the library written in the interpretive language, detecting each of a plurality of the descriptions that refers to a corresponding one of a plurality of the libraries written in the interpretive language, the descriptions being included in the web page description; and
when generating the description of the modified web page, generating the description of the modified web page so as to start the code for editing after completion of initialization of each of the libraries corresponding to one of the detected descriptions.

* * * * *